(12) United States Patent
Lin

(10) Patent No.: US 9,031,518 B2
(45) Date of Patent: May 12, 2015

(54) CONCURRENT HYBRID MATCHING NETWORK

(71) Applicant: QUALCOMM Incorporated, San Diego, CA (US)

(72) Inventor: Saihua Lin, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 290 days.

(21) Appl. No.: 13/717,277

(22) Filed: Dec. 17, 2012

(65) Prior Publication Data

US 2014/0170995 A1 Jun. 19, 2014

(51) Int. Cl.
*H04B 1/44* (2006.01)
*H04M 1/00* (2006.01)
*H04B 1/04* (2006.01)
*H04B 1/18* (2006.01)

(52) U.S. Cl.
CPC ............... *H04B 1/44* (2013.01); *H04B 1/0458* (2013.01); *H04B 1/18* (2013.01)

(58) Field of Classification Search
CPC .......... H04B 1/44; H04B 1/58; H04B 7/0602; H04B 7/0686; H04B 7/0868; H04B 1/7093; H04B 1/52
USPC ................... 455/78, 82, 83, 84, 550.1
See application file for complete search history.

(56) References Cited

U.S. PATENT DOCUMENTS

| | | | |
|---|---|---|---|
| 4,490,684 A | 12/1984 | Epsom et al. | |
| 5,287,069 A | 2/1994 | Okubo et al. | |
| 5,375,257 A * | 12/1994 | Lampen | 455/83 |
| 5,822,429 A * | 10/1998 | Casabona et al. | 380/252 |
| 6,384,679 B1 | 5/2002 | Lorenz | |
| 6,700,440 B2 | 3/2004 | Hareyama | |
| 6,750,707 B2 | 6/2004 | Takei et al. | |
| 6,794,935 B2 | 9/2004 | Klomsdorf et al. | |
| 6,853,245 B2 | 2/2005 | Kim et al. | |
| 7,157,965 B1 | 1/2007 | Kim | |
| 7,183,843 B1 | 2/2007 | Jones et al. | |
| 7,202,736 B1 | 4/2007 | Dow et al. | |
| 7,262,656 B2 | 8/2007 | Shiikuma | |
| 7,295,064 B2 | 11/2007 | Shiikuma et al. | |
| 7,295,065 B2 | 11/2007 | Shah et al. | |

(Continued)

FOREIGN PATENT DOCUMENTS

| | | |
|---|---|---|
| CN | 1407829 A | 4/2003 |
| EP | 2234271 A2 | 9/2010 |

(Continued)

OTHER PUBLICATIONS

Adabi, "A mm-Wave transformer based TR switch in 90nm CMOS technology", Proceedings of the 39th European Microwave Conference, Sep. 2009, 4 pgs.

(Continued)

*Primary Examiner* — Andrew Wendell
(74) *Attorney, Agent, or Firm* — James Gutierrez

(57) ABSTRACT

A concurrent hybrid matching network is disclosed. In an exemplary embodiment, an apparatus includes a phase shifting coupler having a first terminal connected to an antenna, a second terminal connected to a receive signal path, and third terminal connected to a transmit signal path. The apparatus also includes at least one switch to configured to enable one of the receive signal path and the transmit signal path to communicate with the antenna.

18 Claims, 3 Drawing Sheets

(56) References Cited

U.S. PATENT DOCUMENTS

| | | | |
|---|---|---|---|
| 7,609,115 B2 | 10/2009 | Whelan et al. | |
| 7,609,116 B2 | 10/2009 | Gerhard et al. | |
| 7,646,248 B2 | 1/2010 | Yang et al. | |
| 7,663,435 B2 | 2/2010 | Kim et al. | |
| 7,844,231 B2 * | 11/2010 | Yoon | 455/83 |
| 7,863,976 B1 | 1/2011 | Loeb et al. | |
| 7,884,668 B2 | 2/2011 | Blednov | |
| 8,103,221 B2 | 1/2012 | Ta et al. | |
| 8,245,179 B2 | 8/2012 | Inoue | |
| 8,374,279 B2 | 2/2013 | Adler et al. | |
| 2003/0025555 A1 | 2/2003 | Ohnishi et al. | |
| 2003/0076167 A1 | 4/2003 | Hellberg | |
| 2003/0090287 A1 | 5/2003 | Zivanovic | |
| 2005/0030107 A1 | 2/2005 | Shimizu et al. | |
| 2005/0099222 A1 * | 5/2005 | Yang et al. | 327/404 |
| 2005/0134377 A1 | 6/2005 | Dent | |
| 2006/0057981 A1 | 3/2006 | Tsuda | |
| 2006/0087385 A1 * | 4/2006 | Fitzpatrick et al. | 333/117 |
| 2006/0105733 A1 | 5/2006 | Singh et al. | |
| 2006/0232355 A1 | 10/2006 | Park et al. | |
| 2007/0013575 A1 * | 1/2007 | Lee et al. | 342/52 |
| 2007/0149146 A1 | 6/2007 | Hwang et al. | |
| 2008/0117894 A1 | 5/2008 | McMorrow | |
| 2008/0132180 A1 * | 6/2008 | Manicone | 455/83 |
| 2008/0207256 A1 | 8/2008 | Chan | |
| 2009/0190509 A1 | 7/2009 | Yoon | |
| 2009/0219908 A1 * | 9/2009 | Rofougaran | 370/343 |
| 2010/0001802 A1 | 1/2010 | Blednov | |
| 2010/0127780 A1 | 5/2010 | An et al. | |
| 2010/0188146 A1 | 7/2010 | Chung et al. | |
| 2010/0188147 A1 | 7/2010 | Blednov et al. | |
| 2010/0225400 A1 | 9/2010 | Rofougaran et al. | |
| 2010/0295629 A1 | 11/2010 | Klemens et al. | |
| 2011/0026442 A1 | 2/2011 | Yoon | |
| 2011/0032854 A1 * | 2/2011 | Carney et al. | 370/294 |
| 2011/0122932 A1 | 5/2011 | Lovberg et al. | |
| 2011/0140786 A1 | 6/2011 | Blednov | |
| 2011/0169590 A1 | 7/2011 | Namerikawa et al. | |
| 2011/0279184 A1 | 11/2011 | Chan et al. | |
| 2012/0062334 A1 | 3/2012 | Yehezkely | |
| 2012/0105147 A1 | 5/2012 | Harris et al. | |
| 2012/0184233 A1 | 7/2012 | Jones et al. | |
| 2012/0286875 A1 | 11/2012 | Chan | |
| 2013/0241640 A1 | 9/2013 | Lin et al. | |
| 2013/0321097 A1 * | 12/2013 | Khlat et al. | 333/117 |

FOREIGN PATENT DOCUMENTS

| | | |
|---|---|---|
| JP | H08330930 A | 12/1996 |
| JP | H1093470 A | 4/1998 |
| JP | 2003046340 A | 2/2003 |
| JP | 2006295896 A | 10/2006 |
| JP | 2009303040 A | 12/2009 |
| KR | 20060108863 A | 10/2006 |
| WO | 2006066461 A1 | 6/2006 |
| WO | 2011045312 A1 | 4/2011 |

OTHER PUBLICATIONS

Razavi, et al., "A UWB CMOS transceiver," IEEE Journal of Solid-State Circuits, Dec. 2005, vol. 40, No. 12, pp. 2555-2562.

Cohen, et al., "A bidirectional TX/RX four element phased-array at 60GHz with RF-IF conversion block in 90nm CMOS process," 2009 IEEE Radio Frequency Integrated Circuits Symposium, RFIC 2009, pp. 207-210.

Cohen, et al., "A CMOS bidirectional 32-element phased-array transceiver at 60GHz with LTCC antenna," 2012 IEEE Radio Frequency Integrated Circuits Symposium (RFIC), pp. 439-442.

Jeon, et al., "A Triple-Mode Balanced Linear CMOS Power Amplifier Using a Switched-Quadrature Coupler," IEEE Journal of Solid-State Circuits, Sep. 2012, vol. 47, No. 9, pp. 2019-2032.

Kim, et al., "A Switchless Q-Band Bidirectional Transceiver in 0.12um SiGe BiCMOS Technology," IEEE Journal of Solid-State Circuits, Feb. 2012, vol. 47, No. 2, pp. 368-380.

Kim et al., "Optimum operation of asymmetrical-cells-based linear Doherty power Amplifiers-uneven power drive and power matching," IEEE Transactions on Microwave Theory and Techniques, vol. 53, Issue 5, May 2005, 8 pages.

International Search Report and Written Opinion—PCT/US2013/075878—ISA/EPO—Mar. 19, 2014.

* cited by examiner

CONCURRENT HYBRID MATCHING NETWORK

BACKGROUND

1. Field

The present application relates generally to the operation and design of analog front ends, and more particularly, to the operation and design of concurrent matching networks for use in analog front ends.

2. Background

Wireless devices have become increasing more complex resulting in more circuitry being incorporated onto smaller chips and circuit boards. Sharing an antenna between transmit and receive signal paths is the common way to reduce the total pin number in a system-on-chip environment. However, at millimeter (MM) wave frequencies; this may result in additional loss resulting from any switches that are used to share the antenna between the signal paths. One way to solve this problem is to use a two chip solution; one chip for receive operations and one chip for transmit operations. However, a two chip solution may not be possible due to the space constraints of the device. It is also possible to use a conventional power combiner/splitter to share the antenna. However, combiner/splitters typically insert about 3 dB of loss, which may be unacceptable.

Accordingly, what is needed is a mechanism to share an antenna that eliminates switch loss and that avoids using a two chip solution so as to reduce space requirements.

BRIEF DESCRIPTION OF THE DRAWINGS

The foregoing aspects described herein will become more readily apparent by reference to the following description when taken in conjunction with the accompanying drawings wherein.

DETAILED DESCRIPTION

The detailed description set forth below in connection with the appended drawings is intended as a description of exemplary embodiments of the invention and is not intended to represent the only embodiments in which the invention can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. It will be apparent to those skilled in the art that the exemplary embodiments of the invention may be practiced without these specific details. In some instances, well known structures and devices are shown in block diagram form in order to avoid obscuring the novelty of the exemplary embodiments presented herein.

Figure 1:
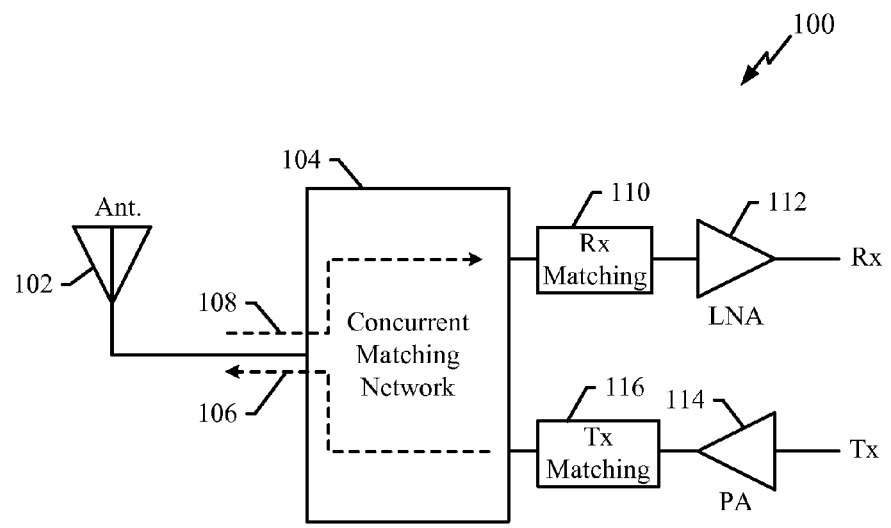
FIG. 1 shows a transceiver portion that comprises an exemplary embodiment of a concurrent matching network for Tx/Rx antenna sharing.

FIG. 1 shows a transceiver portion 100 that comprises an exemplary embodiment of a concurrent matching network 104 for Tx/Rx antenna sharing in a wireless device. For example, the concurrent matching network 104 is suitable for operation at millimeter (MM) wavelength frequencies (i.e., 60 GHz). The matching network 104 operates to connect a Tx path 106 and an Rx path 108 to antenna 102. An Rx matching circuit 110 is configured to receive signals on the Rx path 108 and provide the appropriate input impedance as seen by the concurrent matching network 104 to input these signals to a low noise amplifier (LNA) 112 that is part of a receiver circuit. A power amplifier (PA) 114 that is part of a transmitter is configured to output transmit signals to a Tx matching circuit 116 that provides the appropriate input impedance as seen by the PA 114 to input these transmit signal to the matching network 104 on the transmit signal path 106. In various exemplary embodiments disclosed below, the concurrent matching network 104 operates to provide low loss concurrent matching to the antenna 102 without the use of series switches.

Figure 2:
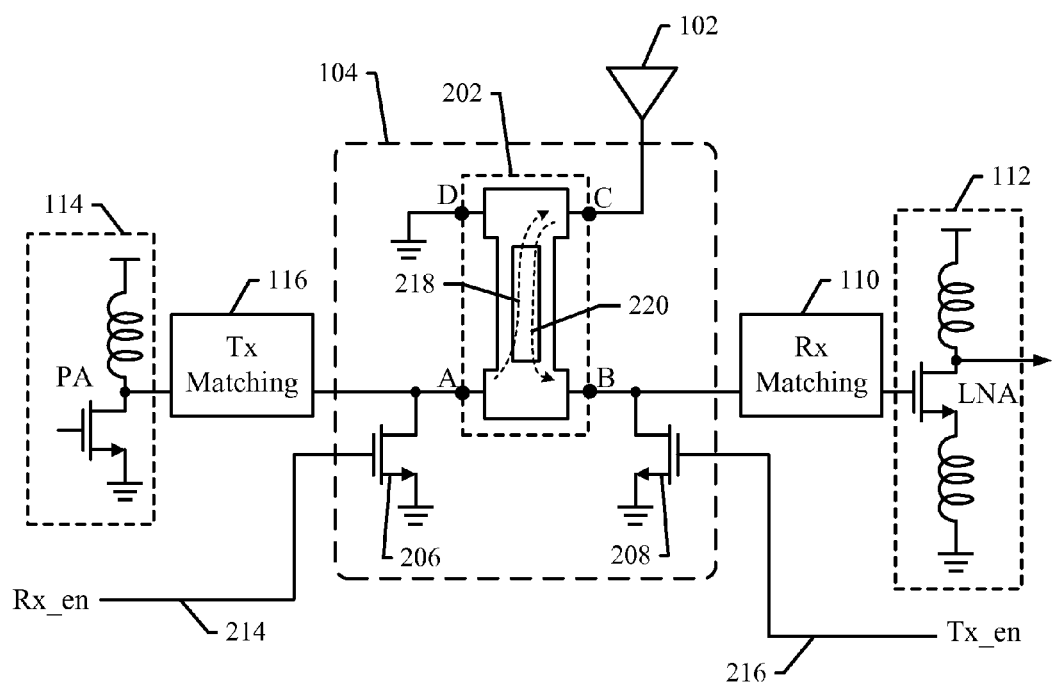
FIG. 2 shows an exemplary detailed embodiment of the concurrent matching network shown in FIG. 1.

FIG. 2 shows an exemplary detailed embodiment of the concurrent matching network 104. The concurrent matching network 104 comprises a phase shifting coupler 202 that has four terminals (A-D). In an exemplary embodiment, the phase shifting coupler 202 comprises a 90-degrees hybrid coupler. The terminal (C) is connected to the antenna 102. The terminal (B) is connected to the Rx matching circuit 110. The terminal (D) is connected to ground to reflect power back into the hybrid coupler 202 so that there is no signal loss associated with terminal (D). The terminal (A) is connected to the Tx matching circuit 116. It should be noted that the 90-degree hybrid coupler 202 can be implemented in any material such as copper or aluminum and in any topology such as transmission line based or transformer based, and is configured to provide a 90-degree phase shift.

An Rx enable switch 206 is connected to the terminal A and a Tx enable switch 208 is connected to the terminal B. When the enable switches are activated they couple their associated terminals to ground thereby disabling their associated signal paths. In an exemplary embodiment, the switches are controlled by a Tx enable signal 216 and an Rx enable signal 214 that are output from a baseband processor or other entity at the device to control whether the concurrent matching circuit 104 is configured for transmit or receive operation.

During transmit mode operation, the power amplifier 114 outputs a transmit signal to the matching circuit 116. The matching circuit 116 provides the optimum input impedance as seen by the PA 114 (i.e., approximately 10 ohms based on the operating power level) to input the transmit signal to terminal A of the 90-hybrid coupler 202. The Tx enable switch 208 is activated by the Tx enable (Tx_en) signal 216 to couple the terminal B to ground thereby disabling the signal path to the Rx matching circuit 110. The Rx enable (Rx_en) signal 214 is set to deactivate the Rx enable switch 206 so that terminal A is decoupled from ground.

The transmit signal received at terminal A of the 90-hybrid coupler 202 is directed to the terminal C as indicated by the transmit signal path 218. The antenna 102 connected to terminal C operates to transmit the transmit signal. Because terminals D and B are effectively coupled to ground, signal power at these terminals is reflected back into the hybrid device 202 and there is no signal loss through these terminals. Thus, the hybrid device 202 directs the transmit signal to the antenna 102 without switches or power loss.

During receive mode operation, the Rx enable switch 206 is activated by the Rx enable signal 214 to couple the terminal A to ground thereby disabling the signal path from the Tx matching circuit 116. The Tx_en signal 216 is set to deactivate the Tx enable switch 208 so that the terminal B is uncoupled from ground. A signal received by the antenna 102 is input to the terminal C of the hybrid coupler 202 and directed to the terminal B as indicated by the receive signal path 220. Because terminals D and A are effectively grounded, signal power at these terminals is reflected back into the hybrid coupler 202 and there is no signal loss through these terminals.

The terminal B of the hybrid coupler 202 is coupled to the Rx matching circuit 110, which provides the appropriate input impedance (i.e., 50 ohms) as seen by the hybrid coupler 202 to input these received signals to the low noise amplifier (LNA) 112. Thus, the 90-hybrid coupler 202 directs the receive signal to the LNA 112 without switches or power loss.

In an exemplary embodiment, the terminal D of the 90-degree hybrid 202 is shorted to ground, floated, or connected with an impedance much higher than 50 ohms depending on the implementation. In an exemplary embodiment, the switch 206 can also be integrated into the Tx matching circuit 116, making the concurrent matching network 104 completely switchless on the PA side. This also operates to further reduce loss.

The various exemplary embodiments herein disclose a concurrent matching network 104 to allow Tx/Rx signal paths to share the same antenna by using the 90-degree hybrid coupler 202. In an exemplary embodiment, the receive signal path and the transmit path are configured to operate at millimeter wavelength frequencies (i.e., 60 GHz). The passive 90-degree hybrid coupler 202 has lower loss when compared to a single pole double throw (SPDT) switch used in series with the signal paths of conventional circuits (i.e., a SPDT switch typically has 2 dB of loss at 60 GHz for off-chip components). By eliminating the series SPDT switch from both transmit and receive signal paths, lower loss is achieved. The exemplary embodiments have wide application and are suitable for both on-chip and off-chip implementations. Accordingly, in an exemplary embodiment, the concurrent matching network 104 comprises a 90-degree hybrid coupler having a first terminal connected to an antenna, a second terminal connected to a receive signal path, and third terminal connected to a transmit signal path. The concurrent matching network 104 also comprises at least one switch configured to enable one of the receive signal path and the transmit signal path to communicate with the antenna.

Alternative Exemplary Embodiments

In various exemplary embodiments, a variety of low loss concurrent matching networks can be configured to utilize a 90-degree hybrid coupler. Two of such alternate exemplary embodiments are illustrated below.

Figure 3:
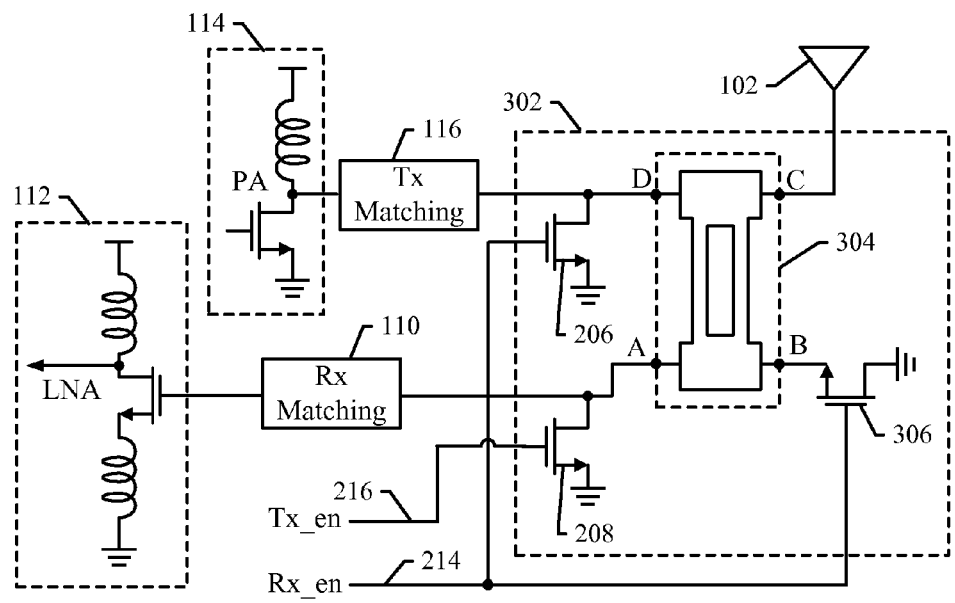
FIG. 3 shows an exemplary alternate embodiment of a concurrent matching network.

FIG. 3 shows an alternate exemplary embodiment of a concurrent matching network 302. The concurrent matching network 302 comprises a 90-degree hybrid coupler 304 that has four terminals (A-D). The terminal C is connected to the antenna 102. The terminal B is connected to transistor 306. The terminal D is connected to the Tx matching circuit 116 and terminal A is connected to the Rx matching circuit 110.

In this exemplary embodiment, the Rx enable signal 214 that is generated from a baseband processor or other entity at the device is configured to control the transistors 206, 306 to selectively couple the terminals B and D to ground. The Tx_en signal 216 is configured to control the transistor 208 to selectively couple the terminal A to ground.

During receive mode operation, the transistors 206, 306 are activated by the Rx enable signal 214 so that the terminals B and D are coupled to ground to reflect power back into the device 304 and therefore there is no signal loss associated with these terminals. The Tx_en signal 216 is set to deactivate the transistor 208 so that the terminal A is decoupled from ground. In this configuration, signals received by the antenna 102 flow through the terminal A of the hybrid coupler 304 to the Rx matching circuit 110 and thereafter to the LNA 112.

During transmit mode operation, the transistors 206, 306 are deactivated by the Rx enable signal 214 so that the terminals B and D are decoupled from ground. The Tx_en signal 216 is set to activate the transistor 208 so that the terminal A is coupled to ground. In this configuration, a transmit signal from the PA 114 flows through the Tx matching circuit 116 and thereafter through the terminal D of the hybrid coupled 304 for transmission by the antenna 102. In an exemplary embodiment, the transistors 306 is deactivated by the Rx_en signal 214 so that terminal B floats during the transmit mode to reflect power back into the hybrid coupler 304. In another exemplary embodiment, the terminal B is coupled to an impedance much higher than 50 ohm to terminal B.

Figure 4:
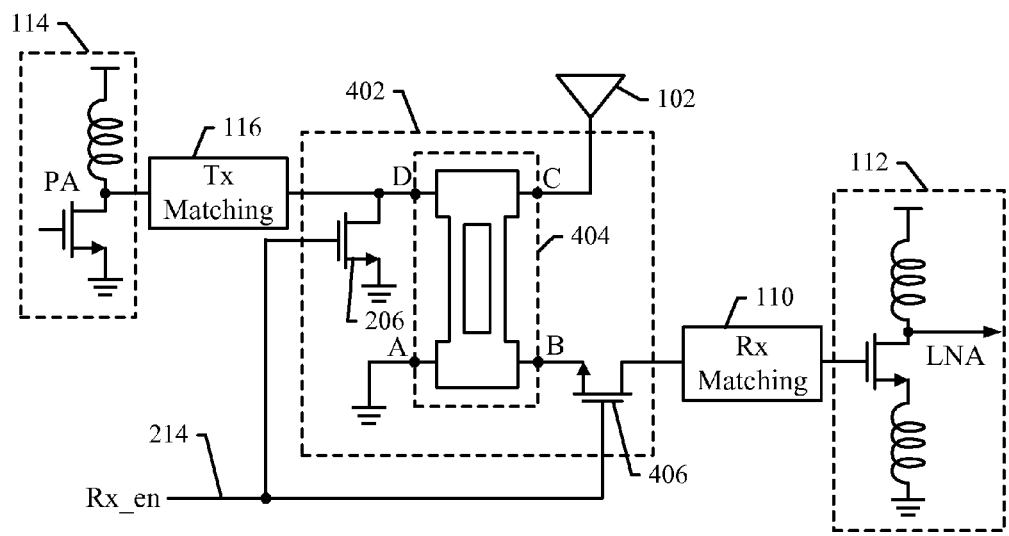
FIG. 4 shows an exemplary alternate embodiment of a concurrent matching network.

FIG. 4 shows an exemplary alternate embodiment of a concurrent matching network 402. The concurrent matching network 402 comprises a 90-degree hybrid coupler 404 that has four terminals (A-D). The terminal C is connected to the antenna 102. The terminal B is connected to transistor 406. The terminal D is connected to the Tx matching circuit 116 and terminal A is connected to ground.

In this exemplary embodiment, the Rx_en signal 214 acts to enable either the receiver or transmit operating mode. For example, the Rx_en signal 214 is coupled to control both the transistor 206 and the transistor 406. The receive mode of operation is activated when the Rx_en signal 214 is set to activate the transistors 206, 406. This configuration couples the terminal D to ground through the transistor 206 and couples the terminal B to the Rx matching circuit 110. This configuration allows a receive signal to flow from the antenna 102 to the LNA 112.

The transmit mode of operation is activated when the Rx_en signal 214 is set to deactivate the transistors 206, 406. This configuration decouples the terminal D to from ground and decouples the terminal B from the Rx matching circuit 110. This configuration allows a transmit signal to flow from the PA 114 to the antenna 102. Thus, the matching circuit 402 is configured to switch between transmit and receive modes using only the Rx_en signal 214.

Figure 5:
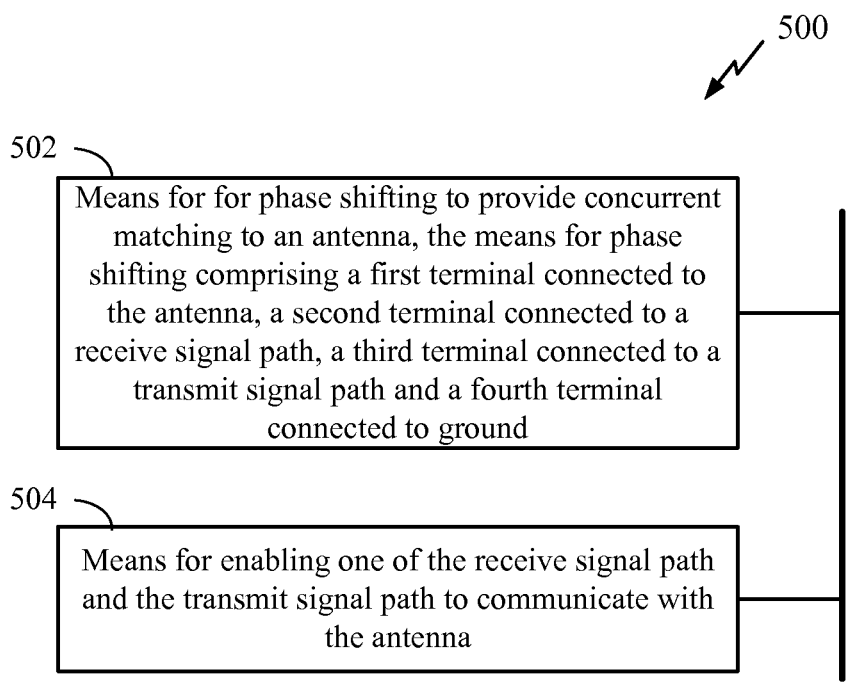
FIG. 5 shows an exemplary embodiment of a concurrent matching network apparatus.

FIG. 5 shows an exemplary embodiment of a concurrent matching network apparatus 500. For example, the apparatus 500 is suitable for as the matching network 104 shown in FIG. 2. In an aspect, the apparatus 500 is implemented by one or more modules configured to provide the functions as described herein. For example, in an aspect, each module comprises hardware and/or hardware executing software.

The apparatus 500 comprises a first module comprising means (502) for phase shifting to provide concurrent matching to an antenna, the means for phase shifting comprising a first terminal connected to the antenna, a second terminal connected to a receive signal path, a third terminal connected to a transmit signal path and a fourth terminal connected to ground. In an aspect, the means for phase shifting comprises the 90-degree hybrid 202.

The apparatus 500 comprises a second module comprising means (504) for enabling one of the receive signal path and the transmit signal path to communicate with the antenna, which in an aspect comprises the transistors 206 and 208.

Those of skill in the art would understand that information and signals may be represented or processed using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. It is further noted that transistor types and technologies may be substituted, rearranged or otherwise modified to achieve the same results. For example, circuits shown utilizing PMOS transistors may be modified to use NMOS transistors and vice versa. Thus, the amplifiers disclosed herein may be realized using a variety of transistor types and technologies and are not limited to those transistor types and technologies illustrated in the Drawings. For example, transistors types such as BJT, GaAs, MOSFET or any other transistor technology may be used.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

The various illustrative logical blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both non-transitory computer storage media and communication media including any medium that facilitates transfer of a computer program from one place to another. A non-transitory storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The description of the disclosed exemplary embodiments is provided to enable any person skilled in the art to make or use the invention. Various modifications to these exemplary embodiments will be readily apparent to those skilled in the art, and the generic principles defined herein may be applied to other embodiments without departing from the spirit or scope of the invention. Thus, the invention is not intended to be limited to the exemplary embodiments shown herein but is to be accorded the widest scope consistent with the principles and novel features disclosed herein.

What is claimed is:

1. An apparatus comprising:
a phase shifting coupler having a first terminal connected to an antenna, a second terminal connected to a receive signal path, and a third terminal connected to a transmit signal path;
a first switch connected to the second terminal and configured to selectively enable the transmit signal path; and
a second switch connected to the third terminal and configured to selectively enable the receive signal path.

2. The apparatus of claim 1, the phase shifting coupler comprising a 90-degree hybrid coupler.

3. The apparatus of claim 1, the first switch configured to connect the receive signal path to the ground to enable the transmit signal path.

4. The apparatus of claim 1, the second switch configured to connect the transmit signal path to the ground to enable the receive signal path.

5. The apparatus of claim 1, the first and second switches configured to operate based on first and second switch control signals.

6. The apparatus of claim 1, the second terminal coupled to an amplifier on the receive signal path.

7. The apparatus of claim 6, further comprising a receive path matching circuit connected between the amplifier and the second terminal.

8. The apparatus of claim 1, the third terminal coupled to an amplifier on the transmit signal path.

9. The apparatus of claim 8, further comprising a transmit path matching circuit connected between the amplifier and the third terminal.

10. The apparatus of claim 1, the receive signal path and the transmit path configured to operate at millimeter wavelength frequencies.

11. An apparatus comprising:
- means for phase shifting to provide concurrent matching to an antenna, the means for phase shifting comprising a first terminal connected to the antenna, a second terminal connected to a receive signal path, and a third terminal connected to a transmit signal path;
- means for enabling the transmit signal path that is connected to the second terminal; and
- means for enabling the receive signal path that is connected to the third terminal.

12. The apparatus of claim 11, the means for phase shifting comprising a 90-degree hybrid coupler.

13. The apparatus of claim 11, the means for enabling the transmit signal path comprising a first switch configured to couple the receive signal path to ground to enable the transmit operation.

14. The apparatus of claim 13, the means for enabling the receive signal path comprising a second switch configured to couple the transmit signal path to ground to enable the receive operation.

15. The apparatus of claim 14, the first and second switches configured to operate based on first and second switch control signals.

16. The apparatus of claim 11, further comprising means for amplifying coupled to the receive signal path.

17. The apparatus of claim 11, further comprising means for amplifying coupled to the transmit signal path.

18. The apparatus of claim 11, the receive signal path and the transmit path configured to operate at millimeter wavelength frequencies.

* * * * *